United States Patent
Vorpahl

(10) Patent No.: US 11,821,258 B2
(45) Date of Patent: Nov. 21, 2023

(54) COVER APPARATUS

(71) Applicant: THODACON WERKZEUGMASCHINENSCHUTZ GMBH, Kolbermoor (DE)

(72) Inventor: Vincent C. Vorpahl, Ottobrunn (DE)

(73) Assignee: THODACON WERKZEUGMASCHINENSCHUTZ GMBH, Kolbermoor (DE)

( * ) Notice: Subject to any disclaimer, the term of this patent is extended or adjusted under 35 U.S.C. 154(b) by 872 days.

(21) Appl. No.: 16/559,827

(22) Filed: Sep. 4, 2019

(65) Prior Publication Data
US 2020/0080366 A1 Mar. 12, 2020

(30) Foreign Application Priority Data

Sep. 7, 2018 (DE) .......................... 102018121853.2

(51) Int. Cl.
*E06B 9/11* (2006.01)
*B23Q 11/08* (2006.01)

(52) U.S. Cl.
CPC ................ *E06B 9/11* (2013.01); *B23Q 11/08* (2013.01)

(58) Field of Classification Search
CPC ............... E06B 9/11; E06B 2009/1577; E06B 2009/1583; E06B 2009/1588; E06B 2009/1594; E06B 9/58; E06B 2009/583; E06B 9/581; B23Q 11/08; B23Q 11/0891; B23Q 11/085
See application file for complete search history.

(56) References Cited

U.S. PATENT DOCUMENTS

| | | | | |
|---|---|---|---|---|
| 2,135,131 A | * | 11/1938 | Bassett | E05F 15/44 49/27 |
| 2,674,546 A | * | 4/1954 | Greenhalgh | H01B 3/447 524/297 |
| 4,163,591 A | * | 8/1979 | Hennig | B23Q 11/085 384/15 |

(Continued)

FOREIGN PATENT DOCUMENTS

| | | |
|---|---|---|
| DE | 3532702 A1 | 3/1987 |
| DE | 4008441 A1 * | 9/1991 |

(Continued)

OTHER PUBLICATIONS

Prettl R; DE 4008441 machine translation; retrieved from https://worldwide.espacenet.com/publicationDetails/biblio?CC=DE&NR=4008441A1&KC=A1&FT=D&ND=3&date=19910919&DB=&locale=en_EP (Year: 1991).*

(Continued)

*Primary Examiner* — Abe Massad
(74) *Attorney, Agent, or Firm* — Dickinson Wright PLLC

(57) ABSTRACT

The application relates to a cover apparatus for a machine, in particular for a machine tool, comprising a cover formed by at least one cover element. The cover comprises a drive motor that is configured and adapted to move the cover from a closed position into an open position. In addition, at least one electrical component is provided that is arranged at the cover. To connect the electrical component indirectly or directly to a control device or to a power source, a connection cable is provided that extends in a receiver that extends in parallel with the guide rail in at least one guide element or in the at least one cover element.

19 Claims, 7 Drawing Sheets

(56) References Cited

U.S. PATENT DOCUMENTS

Figure 1:
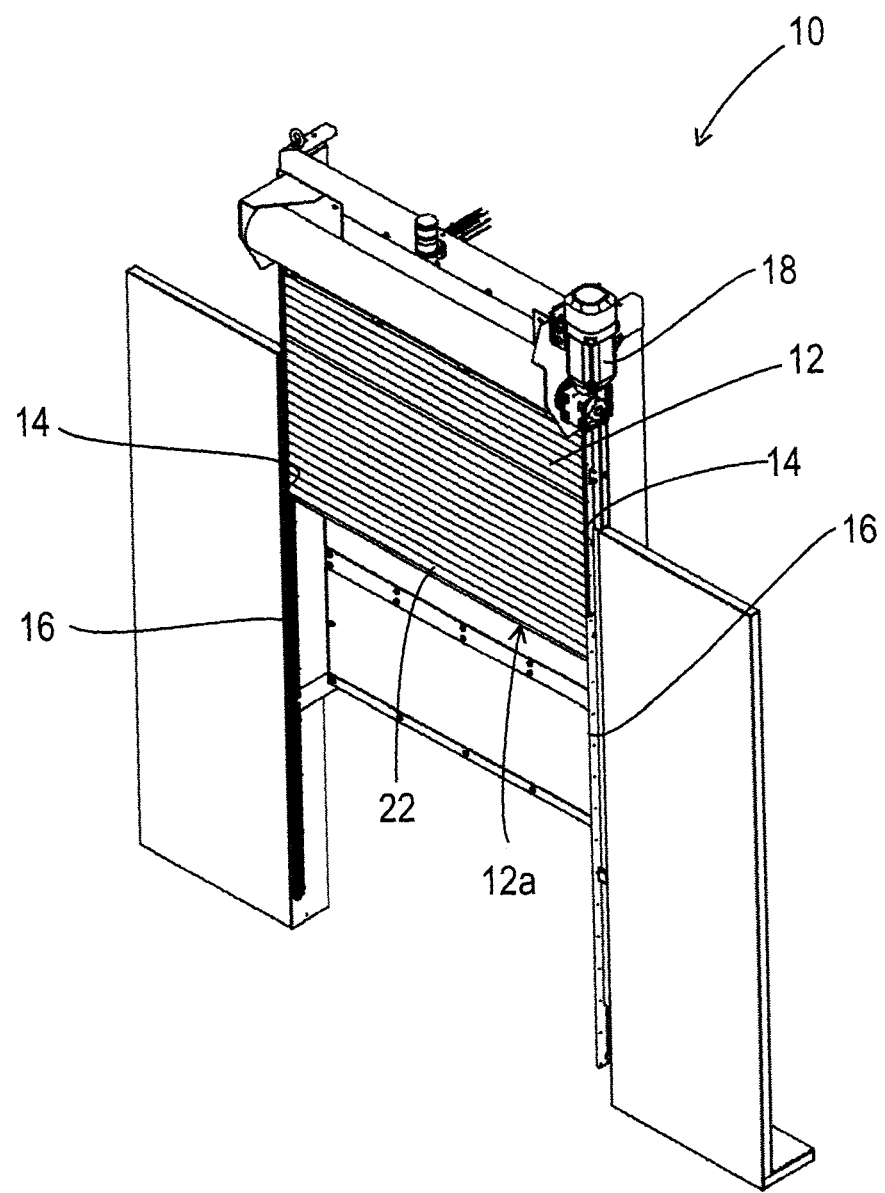

| | | | | |
|---|---|---|---|---|
| 4,628,646 A * | 12/1986 | Eyerle | ............... | E04H 5/06 |
| | | | | 160/133 |
| 6,054,921 A * | 4/2000 | Miller | ............... | E06B 9/58 |
| | | | | 340/541 |
| 6,119,758 A * | 9/2000 | Coenraets | ............... | E06B 9/70 |
| | | | | 160/35 |
| 8,596,329 B2 | 12/2013 | Schonerwald | | |
| 9,410,372 B2 * | 8/2016 | Hanuka | ............... | G08B 13/22 |
| 10,914,117 B2 * | 2/2021 | Rejc | ............... | E05F 15/684 |
| 2015/0136334 A1 * | 5/2015 | Iglesias Ballester | ............... | |
| | | | | E05D 15/165 |
| | | | | 160/310 |
| 2015/0300084 A1 * | 10/2015 | Schönerwald | ............... | E06B 9/70 |
| | | | | 160/133 |

FOREIGN PATENT DOCUMENTS

| | | | |
|---|---|---|---|
| DE | 4321465 A1 * | 12/1994 | ......... B23Q 11/085 |
| DE | 102014202471 B3 | 4/2015 | |
| DE | 102015208222 B3 | 9/2016 | |
| DE | 202015105216 U1 | 2/2017 | |
| JP | 2012121081 A | 6/2012 | |

OTHER PUBLICATIONS

Official Communication received from the German Patent and Trademark Office for related German Application No. 102018121853.2; dated: Aug. 7, 2019; 7 pages.

* cited by examiner

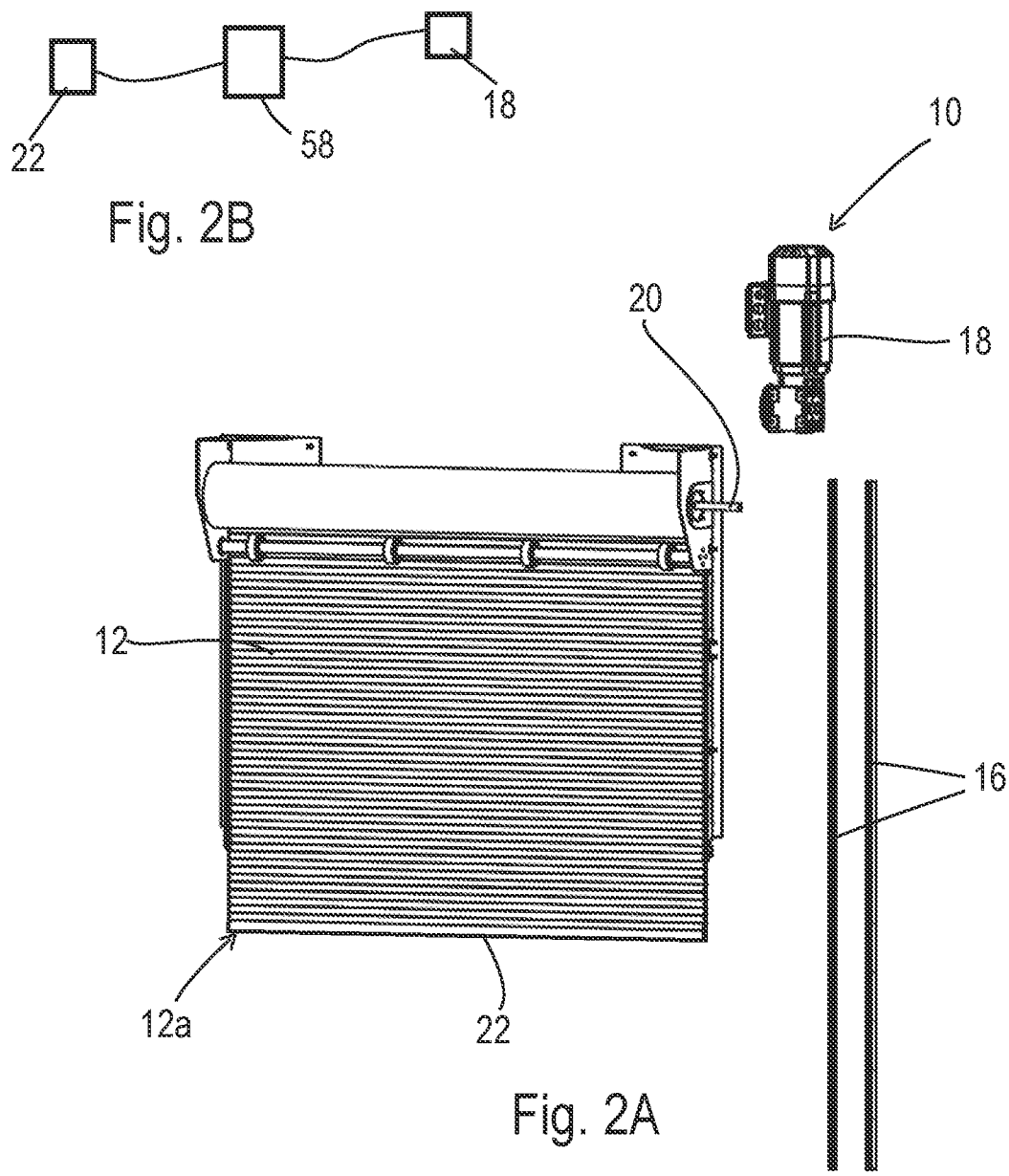

COVER APPARATUS

The present invention relates to a cover apparatus for a machine, in particular for a machine tool.

Such cover apparatus, that are also called roller shutters, rollable protective covers, or electrically driven shutters, serve in machine tools, for example, to prevent an escape of chips or coolant from the machine in the closed state and simultaneously to prevent an unwanted intervention of operators in the machine. On the other hand, an inner space of the machine can be made accessible by an opening of the cover apparatus so that operators or a robot can intervene in the inner space of the machine, for example to clamp, unclamp, or reclamp a workpiece.

In order, for example, to prevent an arm or a hand of the operator from being jammed on a closing of the cover apparatus and/or to prevent the cover apparatus from being damaged by a collision with a workpiece, a sensor can detect whether the cover apparatus may be closed. If the cover apparatus should not be closed, an emergency stop can be triggered so that no collision of the cover apparatus with an object located in a closing plane takes place. So that the cover apparatus can automatically trigger such an emergency stop, the sensor has to be connected to a control device that controls a drive motor of the cover apparatus.

Alternatively or additionally, further electrical components can be provided at a cover of the cover apparatus that communicate a signal to a central control device of the cover apparatus or have to be supplied with power. For example, a position recognition sensor can be provided at the cover that transmits the current position of the cover to the control device of the cover apparatus. In addition, a lamp can be attached to the cover that is supplied with power via a connection cable. In addition, a switch can also be provided at the cover that is connected to the central control device via a connection cable.

It is an object of the present invention to provide a cover apparatus that makes it possible in a simple, safe, and inexpensive manner to connect an electrical component attached to the cover to a control device or power source attached outside the cover.

The object is satisfied by a cover apparatus having the features of claim 1.

The cover apparatus is in particular a cover for a machine, such as a machine tool and has a cover formed by at least one cover element. The cover element can, for example, be formed from a flexible textile. The cover can, however, also comprise a plurality of cover elements. They each be connected stiffly, but movably, to one another.

The cover can have at least one element that is arranged in a lateral region of the at least one cover element.

In addition, the cover apparatus comprises a drive motor that is configured and adapted to move the cover from a closed position into an open position in a direction of movement. The drive motor can preferably be configured and adapted to roll the cover up from a closed position into an open position and/or to roll it down from an open position into a closed position. The term "configured and adapted to" is to be understood such that the drive motor has a suitability for the indicated purpose and is furthermore also used for said purpose. For example, the drive motor can be exclusively configured and adapted to move the cover from a closed position into an open position. A movement from an open position into a closed position could then be taken over by a different element, for example by a return spring or a second drive motor. On the other hand, it is also conceivable that the drive motor is exclusively configured and adapted to move the cover from an open position into a closed position and that a movement from the closed position into the open position is taken over by a further unit, e.g. by a return spring or a second drive motor. The drive motor is preferably configured and adapted to roll the cover up from a closed position into an open position and to roll it down from an open position into a closed position. The drive motor can in this case therefore be drivable in both directions of rotation to roll the cover up and down.

In addition, at least one electrical component is provided that is arranged at the cover. The electrical component is preferably configured as a sensor and is arranged in an end region of the cover. The end region can be disposed in a region of the cover that runs against an end abutment on a closing of the cover.

In accordance with the invention, a receiver extending in parallel with the direction of movement of the cover is formed in the at least one element or in the at least one cover element. A receiver is therefore provided that extends at least sectionally in parallel with the direction of movement of the cover. A connection cable runs in the receiver and connects the electrical component indirectly or directly to a control device or to a power source.

The invention is thus based on the general idea of not guiding a connection cable between an electrical component attached to the cover and a control device or a control source in a cable carrier, for example, but rather to guide the cable directly in the cover, i.e. in the at least one cover element or in the at least one element connected to the cover element. In comparison with the variant with a cable carrier, the solution in accordance with the invention is less expensive and simultaneously more space saving.

Advantageous embodiments of the invention can be seen from the dependent claims, from the description, and from the drawings.

The cover can have at least one element, in particular a guide element, that is arranged in a lateral region of the at least one cover element. The receiver extending in parallel with the direction of movement is preferably formed in the at least one element or guide element.

At least one guide element is advantageously provided in each of the two lateral regions of the cover. The guide element or guide elements can be formed in one piece with the cover element. Alternatively to this, the at least one guide element can be formed as a separate part. This at least one guide element advantageously has a reduced coefficient of friction on steel in comparison with the cover element or cover elements. It is additionally advantageous if the guide element or the guide elements are very largely wear resistant since the guide elements are as a rule mechanically stressed by friction.

The cover apparatus can comprise at least one guide rail that cooperates with the at least one guide element to guide the at least one cover element in a predefined path. In this case, the receiver can extend in parallel with the guide rail.

In accordance with an aspect, the electrical component or at least one of the electrical components is formed as a sensor. The sensor can, for example, be formed as a collision recognition sensor. The sensor thus detects whether the cover collides or will collide with an object. The collision recognition sensor is preferably formed as a contact sensor. Alternatively to this, the collision recognition sensor can be formed as a contactless sensor. In principle, a capacitive sensor, an ultrasound sensor, a force sensor, or a light barrier can, for example, be considered. In accordance with an advantageous embodiment, the collision recognition sensor has a light barrier that radiates though a hollow elastic abutment element arranged in the end region of the cover. If the end region of the cover collides with an object, the hollow elastic abutment element deforms and the light barrier is interrupted. A collision of the cover with an object can thus be recognized in a simple and reliable manner. The elastic abutment element preferably extends over substantially the total width of the cover, i.e. from one lateral end region to the other lateral end region.

Alternatively or additionally, different electrical components can also be attached to the cover. For example, a position determination sensor can be provided via which the position of the cover can be determined. In addition, an electrical light source, for example, an LED can be attached to the cover. A further example for an electrical component is an input apparatus such as a switch. It would also be conceivable to provide a loudspeaker at the cover. Each of these electrical components can be connected to a control device and/or to a power source via the connection cable that extends in the receiver.

The cutout is preferably arranged such that the connection cable lies centrally in the cover viewed in the direction of thickness of the cover. The connection cable is thus in the neutral phase of the cover and is therefore only minimally compressed or stretched if the cover is rolled up.

In accordance with a further aspect, the cover has a plurality of cover elements pivotably connected to one another. The cover elements are preferably connected to one another such that the cover elements and possible connection elements together form a closed surface. It is advantageous in this respect if the cover elements have a narrow elongate shape and are connected to one another at their long sides. Such covers are also called apron way covers. The cover elements can be formed as hollow sections. The specific stiffness of the cover elements is hereby improved and a comparatively light, but stiff cover is thus made possible.

In accordance with an aspect, the cover elements are manufactured from a material that comprises aluminum, plastic and/or steel. Extruded aluminum sections can, for example, be used for the cover elements. Alternatively to this, the cover elements can be manufactured from plastic sections.

In accordance with a further aspect, a plurality of guide elements are provided that are each plugged at the end face onto one of the cover elements. In accordance with this aspect, the guide elements are configured such that they can be partly plugged into the cover elements formed as hollow sections. On the other hand, it would also be conceivable to form two or more pins at the guide elements that engage in end face openings of the cover elements.

Alternatively to this, a plurality of guide elements can be provided that can each be attached at the end face to a single flexible cover element, composed of textile, for example.

In accordance with an aspect, a plurality of the guide elements each have a cutout so that the cutouts together form the receiver extending in parallel with the direction of movement of the cover. The cutouts of the guide elements are preferably arranged in alignment with one another. The plurality of guide elements thus together form a cutout for the connection cable.

To be able to replace guide elements that have to be replaced for reasons of wear, for example, in a simple manner, the guide elements are preferably releasably fastened to the cover elements. A snap lock can, for example, be provided to securely fasten the guide elements to the cover elements. Alternatively, the guide elements can be held in or at the cover elements by friction.

Alternatively to this, the guide elements can be fixedly, i.e. non-releasably, fastened to the cover elements. The guide elements can, for example, be adhesively bonded or welded to the cover elements.

In accordance with an aspect, the receiver for the connection cable is formed as a passage closed at the peripheral side or as a passage opening. This has the advantage that the connection cable is at least sectionally protected from all sides by the cover element or the guide element.

Alternatively to this, the receiver can be formed as a groove. This facilitates an introduction of the connection cable into the cutout. The groove can preferably have an undercut. The undercut can be matched to the diameter of the connection cable such that the connection cable is held in a shape-matched manner in the groove, but can be pulled out of the groove by elastic deformation transversely to the main direction of extent of the groove.

To additionally design the connection cable as oil resistant, the connection cable can have a jacket composed of acrylonitrile butadiene rubber (NBR), polyurethane (PU), or a fluoroelastomer (FKM).

So that the connection cable is kink-resistant, the connection cable preferably has a diameter of at least 4 mm. The connection cable can, for example, have a diameter of 4.2 mm.

In accordance with a further aspect, a roller can be provided that is configured and adapted to roll the cover up onto the roller. The roller is preferably hollow and a part section of the connection cable is led through the roller. The cable can hereby rotate in the region led through the roller while the cover is rolled up. The problem that the cable is, on the one hand, fastened to the cover that is rolling up and, on the other hand is fastened to a non-co-rotating unit, for example to the control unit of the drive motor, is thus solved in a simple manner.

An alternative solution to protect the connection cable from an excessive mechanical strain due to a rolling up of the cover comprises providing a rotation contact, for example a sliding contact, between a connection cable section at the cover and a connection cable section that is not fastened to the cover and is thus not rolled up. In other words, the electrical component can be connected to the control device, to the drive motor, or to the power source by a sliding contact, in particular a rotation contact.

The invention also relates to an apron way cover having a plurality of cover elements that are indirectly or directly connected to one another and that are arranged pivotably with respect to one another to be able to be rolled up. In this respect, either the cover elements themselves or guide elements attached to the cover elements have a receiver for a connection cable, said receiver extending transversely, in particular perpendicular, to the pivot axis. The apron way cover can be configured for a previously described cover apparatus and/or can have one or more of the features described above or below with respect to the cover. The cover or the apron way cover can furthermore be used for further applications, for example in garage doors, in furniture, in vehicles, etc.

Generally, a plurality of links that are stiff per se and that are pivotable with respect to one another are considered as the apron way cover so that the apron way cover can be rolled up.

In accordance with an advantageous embodiment, a connection cable extends in the receiver. The receiver for the connection cable advantageously extends along the total length of the apron way cover extending perpendicular to the main direction of extent of the links. The receiver is preferably formed as a cutout so that the connection cable can be stowed in the apron way cover in a manner that is as space saving as possible.

Figure 3A:
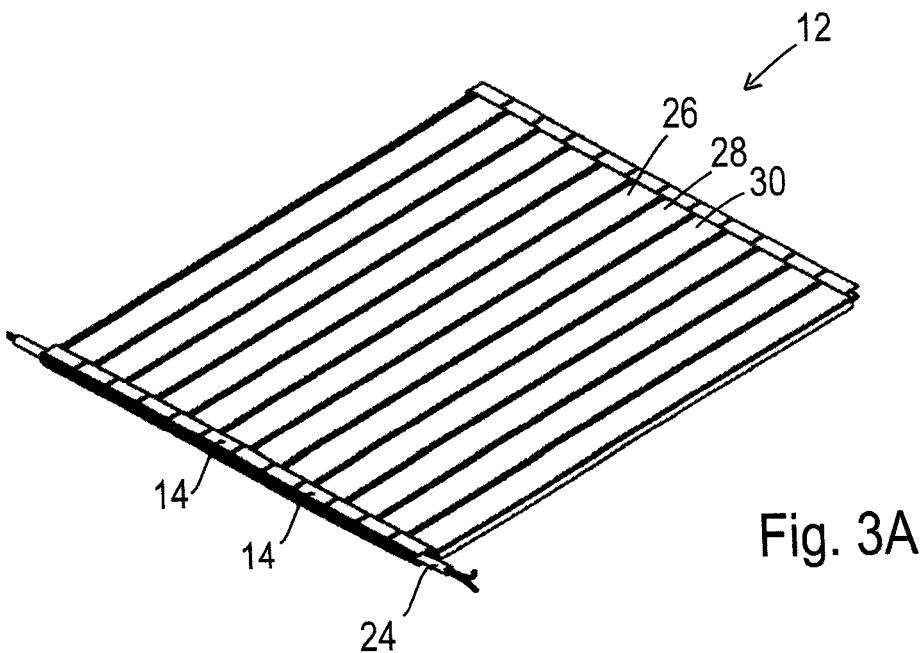
Figure 3B:
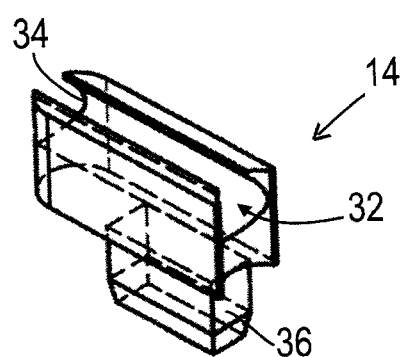
Figure 4A:
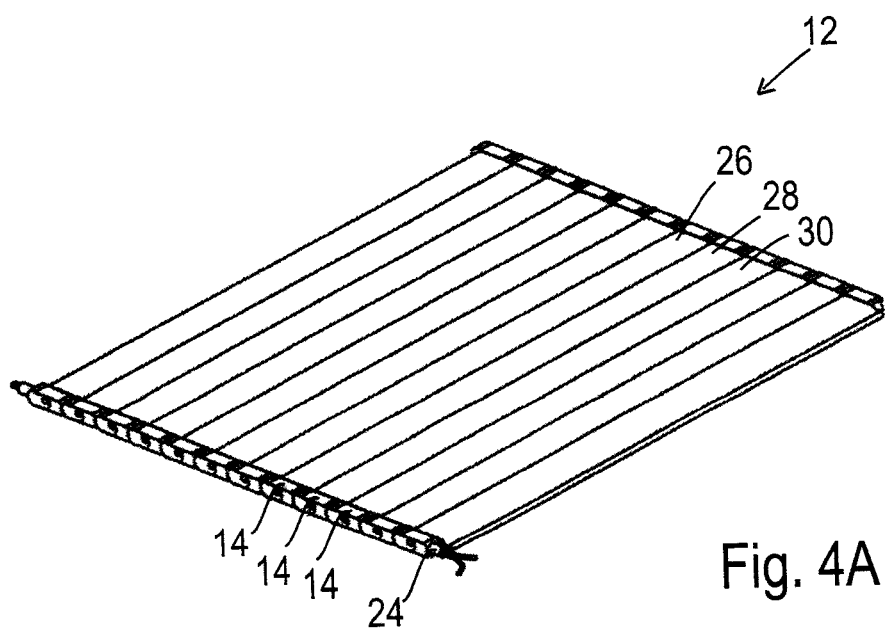
Figure 4B:
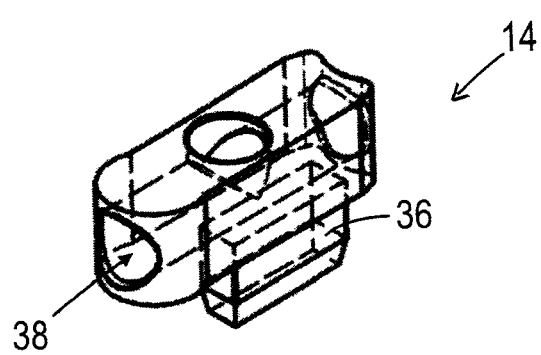
Figure 5A:
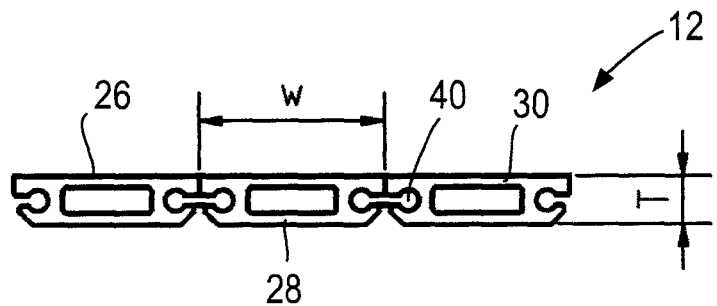
Figure 5B:
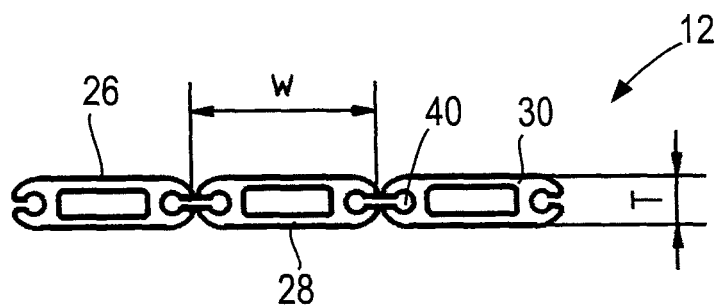
Figure 5C:
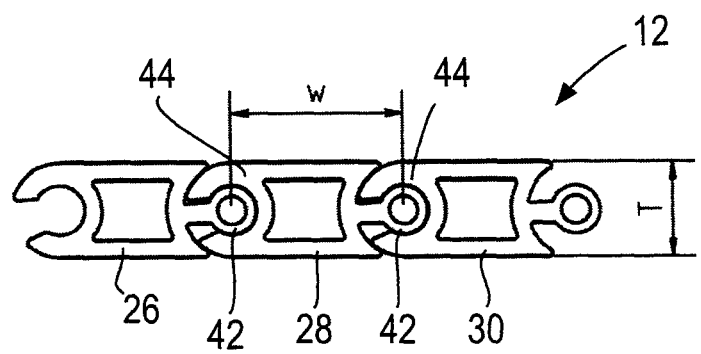
Figure 5D:
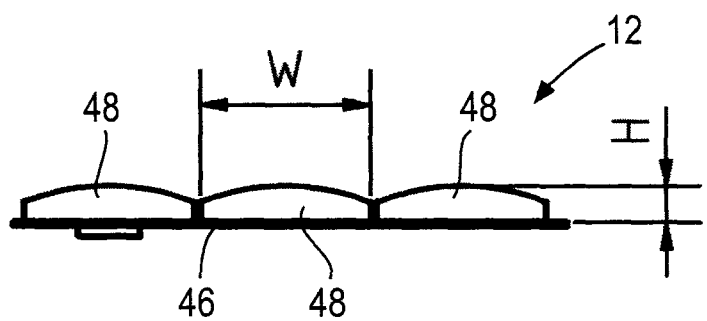
Figure 6:
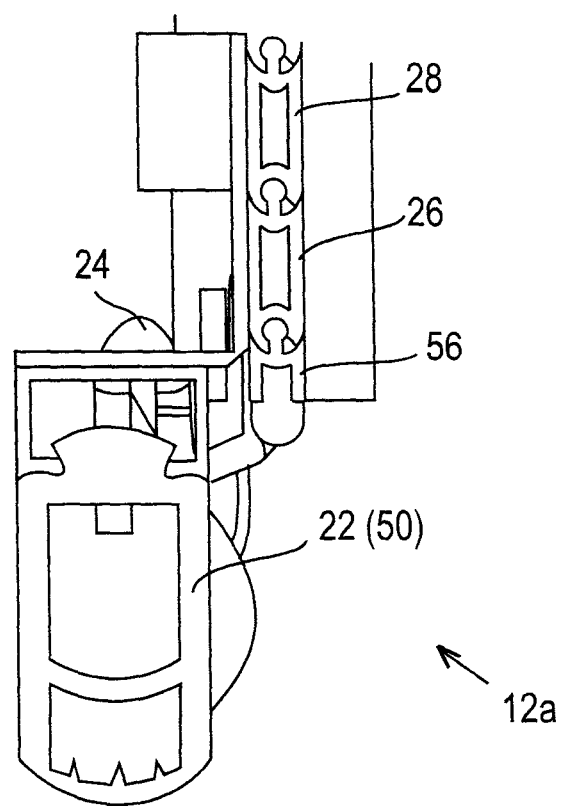
Figure 7:
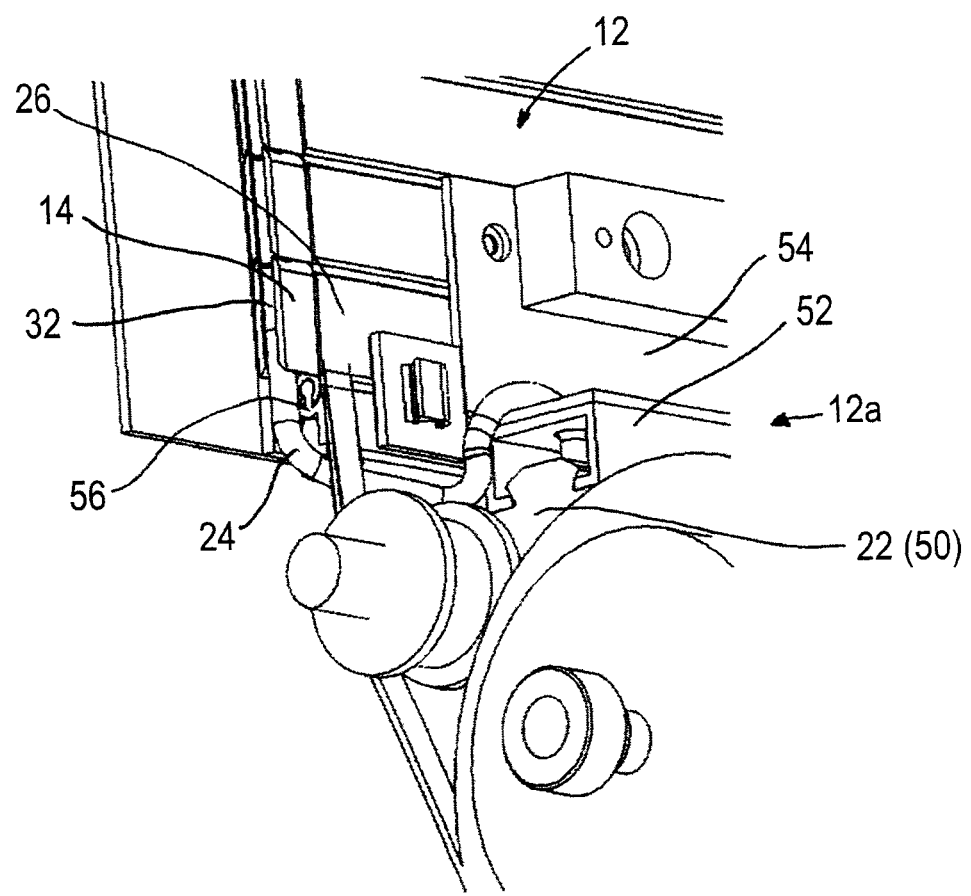

The invention will be described in the following by way of example with reference to the drawings. Elements that are the same or similar are provided with the same reference numerals in the drawings. There are shown:

FIG. 1 a perspective view of a cover apparatus in accordance with a first embodiment in accordance with the invention;

FIG. 2A a perspective detailed view of the cover apparatus of FIG. 1;

FIG. 2B a schematic representation of a sliding contact;

FIG. 3A a perspective view of a cover in accordance with an embodiment in accordance with the invention;

FIG. 3B a guide element of the cover of FIG. 3A;

FIG. 4A a perspective view of a cover in accordance with a further embodiment in accordance with the invention;

FIG. 4B a guide element of the cover of FIG. 4A;

FIG. 5A a cross-sectional view of a plurality of connected cover elements in accordance with a first embodiment;

FIG. 5B a cross-sectional view of a plurality of connected cover elements in accordance with a second embodiment;

FIG. 5C a cross-sectional view of a plurality of connected cover elements in accordance with a third embodiment;

FIG. 5D a cross-sectional view of a plurality of connected cover elements in accordance with a fourth embodiment; and FIG. 6 a detailed view of an end region of a cover apparatus; and FIG. 7 a detailed view with respect to the cable guide in the end region of the cover apparatus.

A cover apparatus 10 is shown in FIG. 1 that can, for example, be used for machine tools, in mechanical and plant engineering, or in the field of automation technology.

The cover apparatus 10 comprises a cover 12 that is rolled up to open the cover apparatus 10 and is rolled down again to close the cover apparatus 10. The cover 12 has lateral guide elements 14 that are each slidingly guided in guide rails 16. In the present case, the guide rails 16 extend in parallel with one another in a vertical direction. Alternatively to this, the guide rails can be arranged in a horizontal direction. The guide rails can also be curved and can, for example, have a horizontally and a vertically extending section.

To roll the cover apparatus 10 up and down, a drive motor 18 is provided that—as can be seen in FIG. 2A—is rotationally fixedly connected to a drive shaft 20. The drive shaft 20 is rotationally fixedly connected to a hollow shaft 56 (see FIGS. 2B and 2C) onto which the cover 12 is rolled up. The drive motor 18 is formed as a motor-transmission unit and is controlled via an integrated control device. A sensor 22 that is formed as a collision recognition sensor is arranged in a lower end region 12a of the cover 12. To transmit a signal provided by the sensor 22 to the drive motor 18, a connection cable is provided that is not shown in FIGS. 1 and 2A.

FIG. 2B shows a sliding contact 58 that connects the sensor 22 to the drive motor 18.

A first embodiment how the connection cable 24 can be guided from the sensor 22 to the drive motor 18 is shown in FIGS. 3A and 3B. The cover 12 is here formed from a plurality of cover elements 26, 28, 30. The cover elements 26, 28, 30 are identical with one another and together form an apron way cover. At the end face, a respective guide element 14 per side is plugged onto each of the cover elements 26, 28, 30. An outwardly open groove 32 (FIG. 3B) is formed in the guide elements 14 that has an undercut 34 and is suitable for receiving the connection cable 24. The undercut 34 is dimensioned such that the connection cable 24 can be pressed into the groove 32 from the outside, but is held in the groove 32.

Each of the guide elements 14 additionally has a plug-in section 36 that has a right-angled cross-section in the present example. It is understood that the plug-in section 36 can have a different cross-section. The cross-section should only be selected to match an end face opening, not shown, of the respective cover element 26, 28, 30 and should connect the guide element 14 rotationally fixedly to the cover element 26, 28, 30. As can be seen in FIG. 3A, the grooves 32 of the plurality of guide elements 14 form a receiver for the connection cable 24 in the direction of the direction of movement of the cover 12, i.e. in parallel with the guide rails 16. The connection cable 24 is hereby laid in a space saving and protected manner between the sensor 22 and the drive motor 18 and no cable carrier is required.

A second embodiment how the connection cable 24 can be guided from the sensor 22 to the drive motor 18 is shown in FIGS. 4A and 4B. In this embodiment, a passage opening 38 is provided as a cutout in the guide element 14 and extends in the direction of the direction of movement of the cover 12 and thus in parallel with the guide rails 16 in the installed state. The connection cable 24 is introduced into the passage openings 38 of the guide element 14 at the end face until it reappears at the oppositely disposed end face. In addition, the plug-in sections 36 of the individual guide elements 14 are, as already described, plugged onto the cover elements 26, 28, 30 at the end face. The passage openings 38 of the guide elements 14—as can be seen in FIG. 4A—also together form a receiver for the connection cable 24 in this embodiment.

The cover elements 26, 28, 30 can be formed as hollow sections. Different possibilities how the cover elements 26, 38, 30 can be formed and how they can be pivotably connected to one another are shown in FIGS. 5A to 5C. A separate connection element 40 is provided in FIGS. 5A and 5B for this purpose and substantially has a bone-like cross-section. Cover elements 26, 28, 30 that can be directly pivotably connected to one another are shown in FIG. 5C. For this purpose, a side of the cover element 26, 28, 30 has a convex section 42 that is engaged around by a concave section 44, formed in a corresponding manner, of the next cover element 26, 28, 30. The convex section 42 and the concave section 44 together form a joint that permits a unilateral pivoting of the cover elements 26, 28, with respect to one another for rolling up the plurality of connected cover elements 26, 28, 30. A pivoting of the cover elements 26, 28, 30 relative to one another to roll up the plurality of cover elements is also only possible in one direction in the version shown in FIG. 5A.

A cover 12 is shown in FIG. 5D that comprises a textile 46 on which sectional members 48, for example composed of metal or plastic, are attached. In this variant, a groove can extend through the sectional member 48 that extends in parallel with the direction of movement of the cover 12 and that forms a receiver for the connection cable 24.

FIGS. 6 and 7 each show an end region 12a of a cover apparatus 10. A sensor 22 in the form of a collision recognition sensor is shown in the end region 12a. The sensor 22 comprises a hollow elastic abutment element 50 in which a light barrier, not shown, is arranged that irradiates along a hollow space formed by the abutment element 50. If the hollow elastic abutment element 50 collides with an object, for example with an arm of the operator or of a robot, the hollow elastic abutment element 50 is deformed. The hollow space is thus reduced and the light barrier is interrupted. A signal thereby generated can then be transmitted via the connection cable 24 to a control device so that the control device can trigger an emergency stop of the drive motor 18.

How the connection cable 24 is guided from the sensor 22 to a receiver in the form of a groove 32 formed by the guide elements 14 is shown in FIG. 7. The connection cable 24 is guided, coming first from the sensor 22, through an opening of a fastening rail 52 connected to the hollow elastic abutment element 50. In addition, the connection cable 24 is guided through an opening of an angled section 54 that connects the fastening rail 52 to the cover 12. The connection cable 24 is subsequently outwardly guided below a cover element 56 terminating the cover 12. The connection cable 24 is guided around a corner region of the terminating cover element 56 and is introduced into the receiver 32 of the last guide element 14. In the present example, the last guide element 14 is attached to a cover element 26 connected to the terminating cover element 56 and no guide element 14 is consequently attached to the terminating cover element 56.

REFERENCE NUMERAL LIST

10 cover apparatus
12 cover
12a end region
14 guide element
16 guide rail
18 drive motor
20 drive shaft
22 sensor
24 connection cable
26 cover element
28 cover element
30 cover element
32 groove
34 undercut
36 plug-in section
38 passage opening
40 connection element
42 convex section
44 concave section
46 textile
48 section member
50 abutment element
52 fastening rail
54 angled section
56 cover element
58 sliding contact

What is claimed is:

1. A cover apparatus for a machine, the cover apparatus comprising
   a cover formed by at least one cover element;
   at least one guide element arranged in a lateral region of the at least one cover element;
   a drive motor that is configured and adapted to move the cover from a closed position into an open position in a direction of movement; and
   at least one electrical component that is arranged at the cover,
   wherein a receiver extending in parallel with the direction of movement is formed in the at least one guide element, in which receiver a connection cable extends that indirectly or directly connects said at least one electrical component to a control device, to a drive motor or to a power source,
   wherein the at least one guide element cooperates with a guide rail to guide the at least one cover element in a predefined path, the at least one guide element having a plug-in section configured to be inserted into the at least one cover element, with the receiver extending outwardly from the plug-in section for movement along the guide rail.

2. The cover apparatus in accordance with claim 1,
   wherein the drive motor is configured and adapted to roll up the cover from the closed position into the open position and/or to roll it down from the open position into the closed position.

3. The cover apparatus in accordance with claim 1,
   wherein the at least one electrical component is formed as a sensor.

4. The cover apparatus in accordance with claim 3,
   wherein the sensor is a collision recognition sensor.

5. The cover apparatus in accordance with claim 1,
   wherein the at least one cover element comprises a plurality of cover elements pivotably connected to one another.

6. The cover apparatus in accordance with claim 5,
   wherein the cover elements are manufactured from a material that comprises at least one of aluminum, plastic and steel.

7. The cover apparatus in accordance with claim 1,
   wherein the at least one guide element includes a plurality of guide elements.

8. The cover apparatus in accordance with claim 7,
   wherein the plurality of guide elements each have a cutout so that the cutouts together form the receiver extending in parallel with the guide rail.

9. The cover apparatus in accordance with claim 1,
   wherein the receiver is formed as a passage closed at its peripheral side or as a passage opening.

10. The cover apparatus in accordance with claim 1,
    wherein the receiver is formed as an outwardly open groove.

11. The cover apparatus in accordance with claim 1,
    wherein the connection cable has a jacket composed of acrylonitrile butadiene rubber, polyurethane, or a fluoroelastomer.

12. The cover apparatus in accordance with claim 1,
    wherein the connection cable has a diameter of at least 4 mm.

13. The cover apparatus in accordance with claim 1,
    wherein a roller is provided that is configured and adapted to roll up the cover onto the roller.

14. The cover apparatus in accordance with claim 1,
    wherein the electrical component is connected via a sliding contact to one of the control device, the drive motor, and the power source.

15. An apron way cover comprising a plurality of cover elements connected indirectly or directly to one another, wherein the cover elements are arranged pivotably with respect to one another about a pivot axis to be able to be rolled up; and
    wherein a plurality of guide elements attached to the cover elements each have a plug-in section inserted into the cover elements and a receiver receiving a connection cable, the receiver extending outwardly from the plug-in section, said receiver extending transversely to the pivot axis and being provided as one of an open groove facing away from the plug-in sections or a passage opening.

16. The apron way cover in accordance with claim 15,
wherein the apron way cover is for a cover apparatus, the cover apparatus comprising
 a cover formed by at least one of said cover elements;
 a drive motor that is configured and adapted to move the cover from a closed position into an open position in a direction of movement; and
 at least one electrical component that is arranged at the cover,
 wherein the open groove or passage opening of the receiver extends in parallel with the direction of movement.

17. A cover apparatus for a machine, the cover apparatus comprising
 a cover formed by a plurality of cover elements coupled for pivotal movement relative to one another;
 wherein a plurality of guide elements have plug-in sections inserted into and arranged in attached relation with a lateral region of the cover elements,
 a drive motor that is configured and adapted to move the cover from a closed position into an open position in a direction of movement; and
 at least one electrical component that is arranged at the cover,
 wherein a receiver of each guide element extends outwardly from the plug-in section of each guide element, in which receiver a connection cable extends in parallel relation with the direction of movement of the cover, wherein the connection cable indirectly or directly connects said at least one electrical component to a control device, to the drive motor or to a power source, wherein the receivers are one of an open groove facing away from the plug-in sections or a passage opening.

18. The cover apparatus in accordance with claim 17, wherein the receivers are open grooves having an undercut dimensioned for pressed receipt of the connection cable into the open grooves, and for holding the connection cable in the open grooves.

19. The cover apparatus in accordance with claim 17, wherein the receivers are passage openings.

\* \* \* \* \*